(12) United States Patent
Robins et al.

(10) Patent No.: US 12,103,249 B2
(45) Date of Patent: Oct. 1, 2024

(54) COMPOSITE FORMING APPARATUS, METHODS, AND SYSTEMS

(71) Applicant: The Boeing Company, Chicago, IL (US)

(72) Inventors: Brian G. Robins, Renton, WA (US); Kurtis S. Willden, Kent, WA (US)

(73) Assignee: The Boeing Company, Arlington, VA (US)

( * ) Notice: Subject to any disclaimer, the term of this patent is extended or adjusted under 35 U.S.C. 154(b) by 179 days.

(21) Appl. No.: 17/460,506

(22) Filed: Aug. 30, 2021

(65) Prior Publication Data
US 2023/0066162 A1    Mar. 2, 2023

(51) Int. Cl.
B29C 70/44    (2006.01)
B29C 70/34    (2006.01)

(52) U.S. Cl.
CPC ............ B29C 70/44 (2013.01); B29C 70/342 (2013.01)

(58) Field of Classification Search
CPC ......... B29C 70/00; B29C 70/30; B29C 70/34; B29C 70/342; B29C 70/40; B29C 70/44
See application file for complete search history.

(56) References Cited

U.S. PATENT DOCUMENTS

| | | |
|---|---|---|
| 5,352,306 A | 10/1994 | Grimshaw et al. |
| 5,387,098 A | 2/1995 | Willden |
| 5,705,794 A | 1/1998 | Gillespie et al. |
| 5,728,309 A | 3/1998 | Matsen et al. |
| 5,747,179 A | 5/1998 | Matsen et al. |
| 5,793,024 A | 8/1998 | Matsen et al. |
| 5,914,064 A | 6/1999 | Gillespie et al. |
| 6,040,563 A | 3/2000 | Matsen et al. |
| 6,087,640 A | 7/2000 | Gillespie et al. |
| 6,180,932 B1 | 1/2001 | Matsen et al. |
| 6,211,497 B1 | 4/2001 | Matsen et al. |
| 6,528,771 B1 | 3/2003 | Matsen et al. |
| 6,566,635 B1 | 5/2003 | Matsen et al. |
| 6,653,608 B1 | 11/2003 | Matsen et al. |
| 6,747,253 B1 | 6/2004 | Firth et al. |
| 6,814,916 B2 | 11/2004 | Willden et al. |

(Continued)

FOREIGN PATENT DOCUMENTS

| | | |
|---|---|---|
| EP | 2 465 667 | 6/2012 |
| EP | 3 865 287 | 8/2021 |

OTHER PUBLICATIONS

Solvay: P720X Release file (Mar. 21, 2013).
European Patent Office, Extended European Search Report, App. No. 22178130.5 (Dec. 7, 2022).

*Primary Examiner* — Christopher T Schatz
(74) *Attorney, Agent, or Firm* — Walters & Wasylyna LLC

(57) ABSTRACT

A composite forming apparatus includes an end effector and a forming feature that is coupled to the end effector. The end effector moves the forming feature relative to a forming tool to form a composite ply over a forming surface of the forming tool or over previously formed composite material on the forming surface of the forming tool. The composite forming apparatus further includes a positioning member engaged with the forming feature. The engagement between the positioning member and the forming feature facilitates a position between the forming feature and the composite ply to promote uniform application of compaction force over the forming surface of the forming tool.

20 Claims, 13 Drawing Sheets

(56) References Cited

U.S. PATENT DOCUMENTS

| | | |
|---|---|---|
| 6,884,975 B2 | 4/2005 | Matsen et al. |
| 6,884,976 B2 | 4/2005 | Matsen et al. |
| 6,914,225 B2 | 7/2005 | Fischer et al. |
| 7,118,370 B2 | 10/2006 | Willen et al. |
| 7,137,182 B2 | 11/2006 | Nelson |
| 7,651,650 B2 | 1/2010 | Willden et al. |
| 8,017,059 B2 | 9/2011 | Matsen et al. |
| 8,142,181 B2 | 3/2012 | Willden et al. |
| 8,236,222 B2 | 8/2012 | Henderson et al. |
| 8,336,596 B2 | 12/2012 | Nelson et al. |
| 8,372,327 B2 | 2/2013 | Matsen et al. |
| 8,383,998 B1 | 2/2013 | Matsen et al. |
| 8,410,409 B1 | 4/2013 | Matsen et al. |
| 8,480,823 B1 | 7/2013 | Matsen et al. |
| 8,556,619 B2 | 10/2013 | Matsen et al. |
| 8,578,995 B2 | 11/2013 | Nelson |
| 8,708,691 B2 | 4/2014 | Matsen et al. |
| 8,808,490 B2 | 8/2014 | Hagman et al. |
| 8,884,201 B2 | 11/2014 | Matsen et al. |
| 8,963,058 B2 | 2/2015 | Matsen et al. |
| 8,980,029 B1 | 3/2015 | Nigro et al. |
| 9,314,975 B1 | 4/2016 | Matsen et al. |
| 9,469,408 B1 | 10/2016 | Elangovan et al. |
| 9,510,398 B1 | 11/2016 | Miller et al. |
| 9,586,362 B2 | 3/2017 | Matsen et al. |
| 9,610,654 B1 | 4/2017 | Matsen et al. |
| 9,635,714 B2 | 4/2017 | Matsen et al. |
| 9,635,715 B1 | 4/2017 | Miller et al. |
| 9,656,829 B2 | 5/2017 | Hagman et al. |
| 9,663,247 B2 | 5/2017 | Rotter et al. |
| 9,820,339 B2 | 11/2017 | Matsen et al. |
| 9,868,249 B2 | 1/2018 | Matsen et al. |
| 10,000,026 B2 | 6/2018 | Matsen et al. |
| 10,018,175 B2 | 7/2018 | Marcoe et al. |
| 10,058,950 B1 | 8/2018 | Gerken et al. |
| 10,086,596 B2 | 10/2018 | Desjardien et al. |
| 10,219,329 B2 | 2/2019 | Matsen et al. |
| 10,377,084 B2 | 8/2019 | Matsen et al. |
| 10,442,120 B2 | 10/2019 | Matsen et al. |
| 10,456,960 B2 | 10/2019 | Chapman et al. |
| 10,464,240 B2 | 11/2019 | Matsen et al. |
| 10,654,199 B2 | 5/2020 | Matsen et al. |
| 10,688,697 B2 | 6/2020 | Sundquist et al. |
| 10,701,767 B2 | 6/2020 | Matsen et al. |
| 10,703,027 B2 | 7/2020 | Matsen et al. |
| 10,743,377 B2 | 8/2020 | Matsen et al. |
| 10,756,501 B2 | 8/2020 | Chen et al. |
| 10,792,842 B2 | 10/2020 | Matsen et al. |
| 10,899,081 B2 | 1/2021 | Matsen et al. |
| 10,994,450 B2 | 5/2021 | Matsen et al. |
| 2005/0053762 A1 | 3/2005 | Willden et al. |
| 2006/0291991 A1 | 12/2006 | Willden et al. |
| 2010/0043941 A1 | 2/2010 | Henderson et al. |
| 2011/0203737 A1 | 8/2011 | Slyne |
| 2016/0368226 A1 | 12/2016 | Encinosa et al. |
| 2019/0070772 A1* | 3/2019 | Stone ............... B29D 99/0003 |
| 2020/0016797 A1 | 1/2020 | Chapman et al. |

* cited by examiner

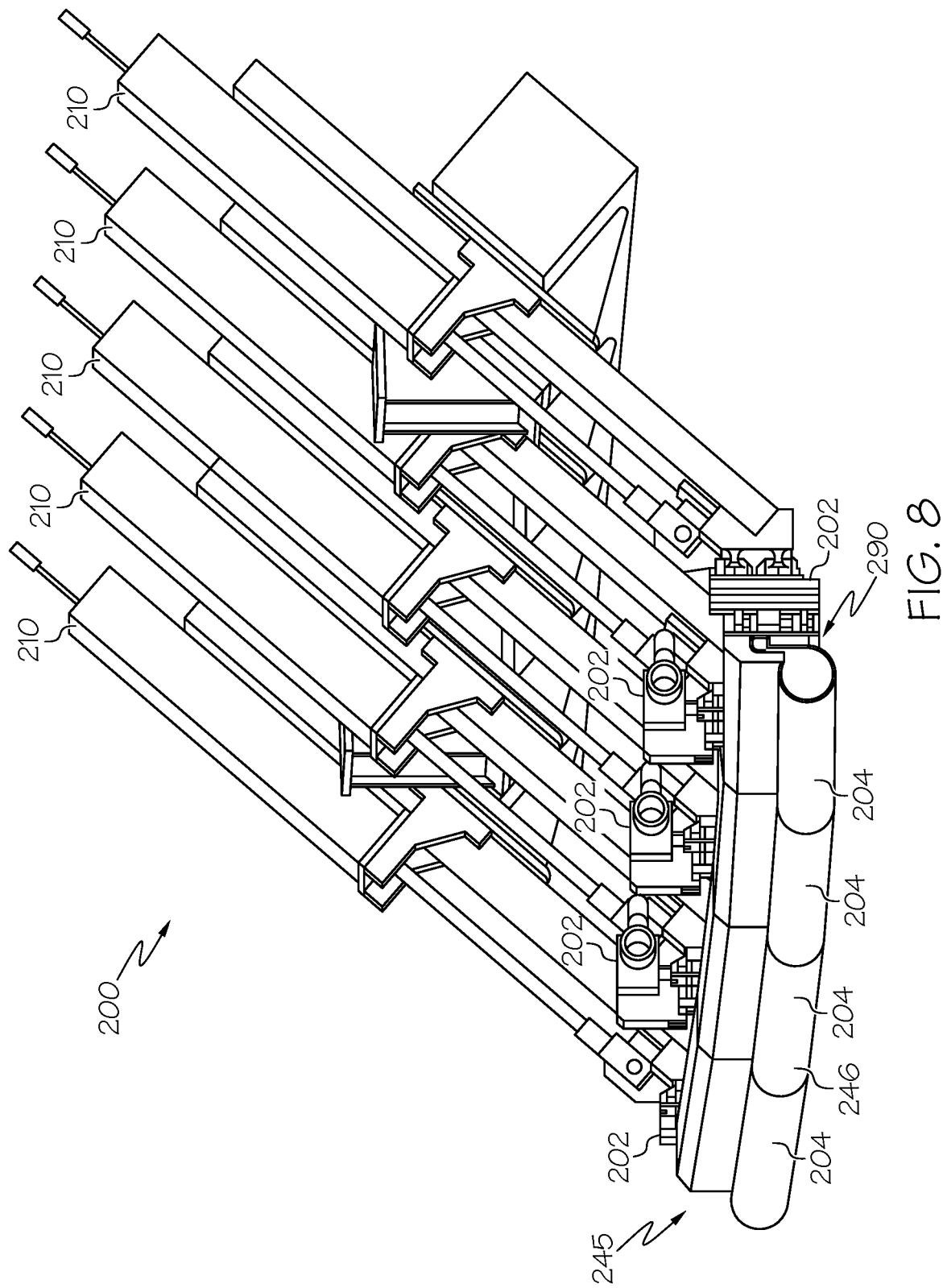

COMPOSITE FORMING APPARATUS, METHODS, AND SYSTEMS

FIELD

The present application relates to manufacturing of composite parts and, more particularly, to apparatus, methods, and systems for forming of composite parts.

BACKGROUND

Formed composite structures are commonly used in applications where light weight and high strength are desired, such as in aircraft and vehicles. Often, these applications utilize contoured parts that must be formed and then cured. Conventional formation of composite structures, particularly relatively large composite structures or composite structures having a complex contour, requires extensive manual labor prior to curing. For example, composite fiber plies (e.g., pre-impregnated fiber plies or dry fabric) are laid by hand over a shaped forming tool or mandrel. The part is then cured, often by heating and pressure. The resulting part matches the shape of the forming tool. However, manual layup of the fiber plies is time consuming and laborious.

Some known composite manufacturing processes attempt to automate a portion of the formation operation. As an example, a drape forming process includes heating a laminate stack of pre-impregnated fiber plies ("composite charge") and forcing it around a mandrel with the use of a vacuum bag or rubber bladder. However, this method has achieved limited success on thick laminates or structures with more complex shapes. As another example, a compactor may be used to compress the composite charge against a tool surface during fabrication. However, this method often requires supplemental manual formation after compaction when the tool surface and resulting structure is contoured. Accordingly, while such methods may be effective at forming relatively small and thin composite structures or composite structures with relatively simple shapes, they may be inefficient when applied to forming large composite structures or composite structures with more complex shapes. Specifically, forming composite material to complex and intricate contours of a forming tool may be challenging.

Accordingly, those skilled in the art continue with research and development efforts in the field of composite manufacturing and, more particularly, to the manufacture of relatively large and/or relatively complex composite structures.

SUMMARY

Disclosed are composite forming apparatus.

In one example, the disclosed composite forming apparatus includes an end effector and a forming feature that is coupled to the end effector. The forming feature sweeps into engagement with a composite ply relative to a forming tool to form the composite ply over one of a forming surface of the forming tool when the forming surface is free from composite material and at least one previously formed ply over the forming surface of the forming tool when the forming surface includes at least one previously formed ply. The composite forming apparatus further includes a positioning member that is engageable with the forming feature. Engagement between the positioning member and the forming feature facilitates a position between the forming feature and the composite ply to promote uniform application of compaction force over the forming surface of the forming tool.

In another example, the disclosed composite forming apparatus includes an end effector, a forming feature that is coupled to the end effector, the forming feature sweeps into engagement with a composite ply relative to a forming tool to form the composite ply over one of a forming surface of the forming tool and at least one previously formed ply over the forming surface of the forming tool, and a positioning member that is engageable with the forming feature, wherein engagement between the positioning member and the forming feature facilitates a position between the forming feature and the composite ply.

Also disclosed are methods for forming a composite part.

In one example, the disclosed method for forming a composite part includes applying at least one ply of composite material over a forming surface of a forming tool. The method further includes positioning a positioning member into engagement with a forming feature. The method further includes, after the positioning, forming the at least one ply of composite material over the forming surface of the forming tool and/or prior formed substrate plies with the forming feature.

Also disclosed are methods for manipulating a composite material on a tool.

In one example, the disclosed method for manipulating a composite material on a tool includes positioning a positioning member into engagement with a forming feature to manipulate a position of the forming feature. The method further includes moving the forming feature into engagement with the composite material.

Also disclosed are composite forming systems.

In one example, the disclosed composite forming system includes a movement mechanism, an end effector that is coupled to the movement mechanism, a forming feature that is coupled to the end effector, and a positioning member that is coupled to the forming feature. The end effector selectively moves the forming feature relative to a forming surface of a forming tool to apply a compaction force to a composite ply. The movement mechanism selectively moves the end effector relative to the forming surface of the forming tool to deform a portion of the composite ply over a portion of the forming surface using the forming feature. The positioning member selectively positions the forming feature into engagement with a portion of the composite ply over a portion of the forming surface.

Other examples of the disclosed apparatus, methods and systems will become apparent from the following detailed description, the accompanying drawings and the appended claims

BRIEF DESCRIPTION OF THE DRAWINGS

FIG. 8 is a schematic, perspective view of an example of a plurality of second composite forming apparatus of the composite forming system;

DETAILED DESCRIPTION

Figure 1:
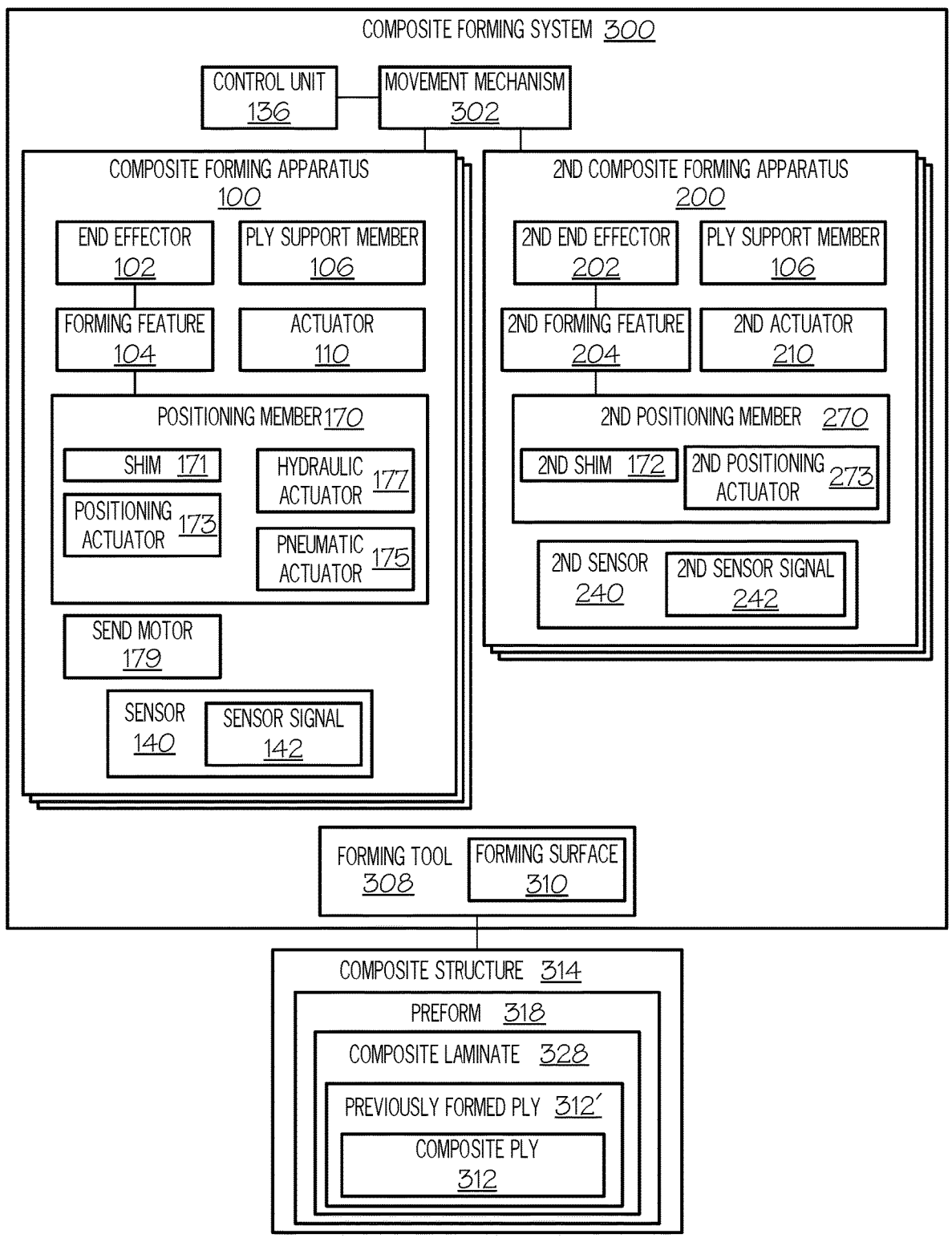
FIG. 1 is a schematic block diagram of an example of a composite forming system.

Referring generally to FIGS. 1-12, by way of examples, the present disclosure is directed to a composite forming apparatus 100 and a composite forming system 300 for forming a composite on a forming tool during a composite manufacturing operation. Referring generally to FIGS. 1-12, the present disclosure is also directed to methods 500 and 700 for forming a composite on a forming tool during a composite manufacturing operation. In one or more examples, implementations of the composite forming apparatus 100, the composite forming system 300 and the methods 500 and 700 are utilized to individually lay down a number of composite plies on a forming tool to form a composite laminate on the forming tool 308, which is subsequently cured on the forming tool 308 to form a composite structure 314.

Referring to FIG. 1, examples of the composite forming apparatus 100 and the composite forming system 300 enable automated, or at least partially automated, fabrication of a composite laminate 328 on a forming tool 308. The composite laminate 328 is then cured through the application of heat and/or pressure (e.g., using an oven or autoclave) to manufacture a composite structure 314. More particularly, examples of the composite forming apparatus 100 and the composite forming system 300 enable automated, or at least partially automated, compaction and formation of at least one composite ply 312 over a forming surface 310 of the forming tool 308 for manufacture of the composite laminate 328. In other words, as used herein, composite ply 312 may be one ply or a ply of a stack of plies.

Automation of the ply formation process can provide a reduction in processing time, a reduction in labor and costs, and/or a reduction of process variations (e.g., human error) that may lead to undesired inconsistencies (particularly out of tolerance inconsistencies) in the finished composite structure as compared to conventional composite fabrication. In particular, the composite forming apparatus 100 and the composite forming system 300 enable, for example, ply-by-ply application (e.g., layup) of composite material to fabricate the composite laminate 328 on the forming tool 308. Following layup, the composite laminate 328 is cured, for example, on the forming tool 308, to form the composite structure 314. While the present disclosure is not limited to ply-by-ply forming, ply-by-ply forming facilitates fabrication of large composite structures, thick composite structures and/or composite structures with complex shapes. Ply-by-ply formation can also provide a reduction in buckling or wrinkling of plies within the composite structure as compared to conventional composite fabrication. Specifically, ply-by-ply reduces the disadvantages of the forming flat laid multiple ply laminates at one time. Challenges arise in having various plies shear or slip relative to the other plies enough to sufficiently mate up to the desired contour of the mandrel, forming tool, or previously formed plies of composite material. The outer plies have a different length and contour than the previously formed ply 312' closer to the mandrel.

Referring to FIGS. 1-8, the composite forming apparatus 100 and composite forming system 300 operate to compact (e.g., apply pressure of force to) and deform (e.g., manipulate) the composite ply 312 on or over the forming surface 310 of the forming tool 308. The composite forming apparatus 100 and composite forming system 300 operate to compact uniformly across non-uniform tool geometries by use of one or more positioning member 170. Additionally, the composite forming apparatus 100 and composite forming system 300 may operate to transfer heat to a localized region of the composite ply 312 that is being compacted and deformed.

In one or more examples, the composite ply 312 includes a single ply (e.g., one layer of thickness) of a composite material. In other examples, the composite ply 312 includes a plurality of plies (e.g., a plurality of layers of thickness) of the composite material. Throughout the present disclosure, the phrase "composite ply" refers to a number of plies or layers of the composite material, unless explicitly stated otherwise. The composite ply 312 may also be referred to as a composite patch, a composite preform, or a composite charge. Further, a composite ply 312 may be placed on top of a previously formed ply 312', for example, plies making up the first and subsequent layers on the mandrel. The forming of the new composite ply 312 is over the previously formed ply 312', which has a different contour than any other previously formed ply 312'.

The composite material may take the form of any one of various suitable types of composite material having any one of various ply angles or fiber orientations. In one or more examples, the composite material includes a fiber reinforcement, also referred to as a dry fabric. In these examples, the composite laminate 328 is formed of a number of composite plies 312 of the dry fiber reinforcement, which is infused with a matrix material (e.g., resin) following layup on the forming tool 308. In one or more examples, the composite material includes a fiber reinforcement that is impregnated with the matrix material, also referred to as a pre-preg. In these examples, the composite laminate 328 is formed by laminating a number of composite plies 312 of the pre-preg, such as multiple courses of unidirectional composite tape, which are pre-impregnated with a resin matrix.

In a particular example, the composite ply 312 is a multi-axial non-crimp fabric that includes a thermoplastic veil and a knit stitch. Application of heat to the composite ply 312 immediately before and/or during compaction and formation of the composite ply 312 softens the thermoplastic veil to improve deformability of the composite ply 312. It also improves tack of the various layers to each other when compressed and cooled during the forming process. Application of heat to the composite ply 312 immediately before and/or during compaction and formation of the composite ply 312 also melts the knit stitch and increases the tackiness of the thermoplastic veil to improve adhesion of the composite ply 312 (to each other as part of a preform 318.

As such, the composite laminate 328 is formed on the forming tool 308 from a number of composite plies 312.

Additionally, in one or more examples, the composite laminate 328 is cured on the forming tool 308 to form the composite structure 314. Accordingly, in one or more examples, the forming tool 308 is a dual-purpose tool, which serves as a layup tool (e.g., mandrel) and a cure tool.

The forming tool 308 defines a shape of the composite laminate 328 formed on the forming tool 308 and, thus, a shape of the composite structure 314 cured on the forming tool 308. In an example, the forming surface 310 corresponds to and defines a shape of an inner mold line (IML) surface the composite laminate 328 and, thus, the composite structure 314. In these examples, the composite forming apparatus 100 shapes an outer mold line (OML) surface of the composite laminate 328 and, thus, the composite structure 314 forms the OML of each of the plies and pushes the composite ply 312 against the 310 forming tool 308 or layers of a previously formed ply 312' such that voids are not created or are within tolerance. Eventually, when the final ply is formed, the final OML of the composite structure 314 is reached. In another example, the forming surface 310 corresponds to and defines a shape of the outer mold line (OML) surface of the composite laminate 328 and, thus, the composite structure 314. In these examples, the composite forming apparatus 100 shapes the inner mold line (IML) surface of the composite laminate 328 and, thus, the composite structure 314.

In one or more examples, the forming tool 308 has any one of various shapes depending on the composite structure 314 being manufactured. As an example, the forming tool 308 is a stringer forming tool and the composite structure 314 is a composite stringer. As another example, the forming tool 308 is a spar forming tool and the composite structure 314 is a composite spar. As another example, the forming tool 308 is a panel, such as wing skin panel and/or fuselage skin panel forming tool and the composite structure 314 is a composite panel. The forming tool 308 may include various non-uniform geometric shapes including curves, joggles, cervices, and more.

Referring to FIG. 1, the composite forming system 300 includes a composite forming apparatus 100. The composite forming apparatus 100 may be located within a frame 334, see FIG. 4. In an example, the frame 334 is generally rectangular in shape. The frame 334 defines vertical axis 338, horizontal axis 340, and longitudinal axis 342. The frame 334 surrounds a carriage 336 having a shape that is generally the same as the frame 334 but is smaller such that the carriage 336 nests within the frame 334. In an example, the carriage 336 is movably connected to the frame 334 such that it may pivot or rotate along the vertical axis 338 and horizontal axis 340 to accommodate any specific geometry or configuration and achieve a best fit position.

The composite forming apparatus 100 includes an end effector 102. The end effector 102 is movably connected to the carriage 336. In an example, the end effector 102 is movable via an actuator 110. The end effector 102 may include one or more sensor 140 configured to detect the location of a forming tool 308 along multiple axes including a vertical axis 338, horizontal axis 340, and longitudinal axis 342 for precise forming on a complex forming tool 308. The one or more sensor 140 may be in communication with a control unit 136. The control unit 136 is configured to receive data from the one or more sensor 140 and analyze that data to control movement of the end effector 102. The control unit 136 may utilize one or more numerical control program in conjunction with the data collected from the one or more sensor 140 to determine proper movement and placement of the end effector 102.

The end effector 102 includes a forming feature 104. In an example, the forming feature 104 is a forming finger. In an example, forming feature 104 is a bladder 118. The bladder 118 is configured, such as in a "fire hose" configuration, to passively follow forming tool 308 contours by applying consistent compaction force 144. Compaction force 144 may vary. In an example, compaction force 144 may be up to 20 lbs per linear inch. The bladder 118 position, profile, or orientation may be manipulated with one or more positioning member 170.

In one or more examples, the forming feature 104 includes, or takes the form of, a wiper. The wiper includes a wiper body and a wiper edge that extends from the wiper body. The wiper has any suitable geometry and/or stiffness depending on the application of the forming feature 104.

In one or more examples, the forming feature 104 includes, or takes the form of, a finger. The finger includes a finger body and a finger end that extends from the finger body. The finger has any suitable geometry and/or stiffness depending on the application of the forming feature 104.

In other examples, the forming feature 104 includes, or takes the form of, any one of various other forming members having various shapes, geometries, and/or configurations. For example, the body 108 of the forming feature 104 may be a bead of material, such as a bead of silicone, rubber, and the like.

Referring to FIG. 1, in one or more examples, the forming feature 104 is made of any material that is suitable for contact with the composite ply 312 in order to deform the composite ply 312 over the forming surface 310 and compact the composite ply 312 against the forming surface 310. The forming surface 310 may be the actual surface of the forming tool 308, or mandrel. In another example, the forming surface 310 may be previously applied composite material 325 on the forming tool 308.

In one or more examples, the forming feature 104 is made of a material that is capable of withstanding generated by heat and transferring to the composite ply 312 when the forming feature 104 is in contact with the composite ply 312. In one or more examples, the forming feature 104 is made of a material that is flexible.

Figure 3A:
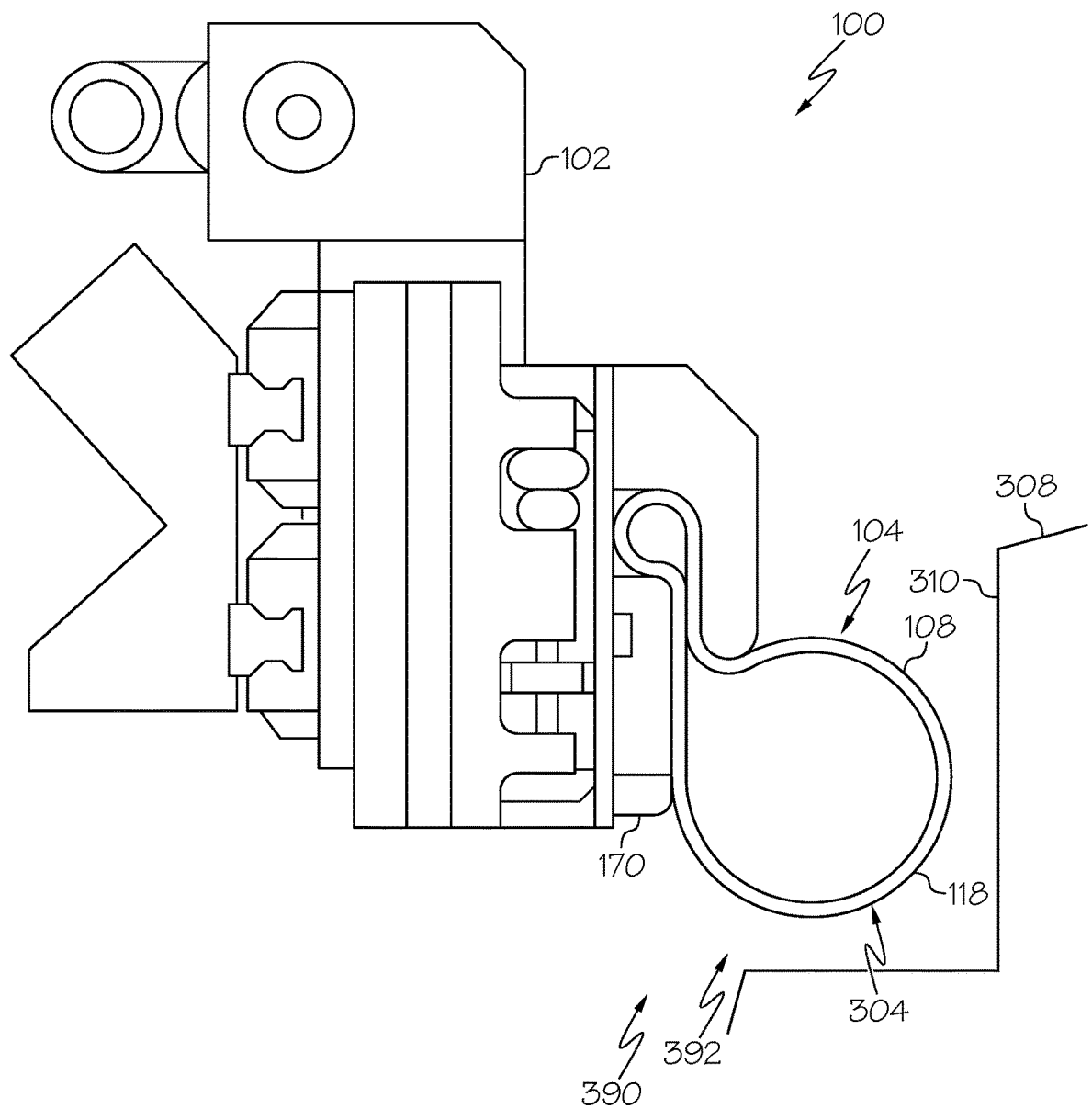
FIG. 3A is a schematic, elevational view of an example of a portion of the composite forming system.
Figure 3B:
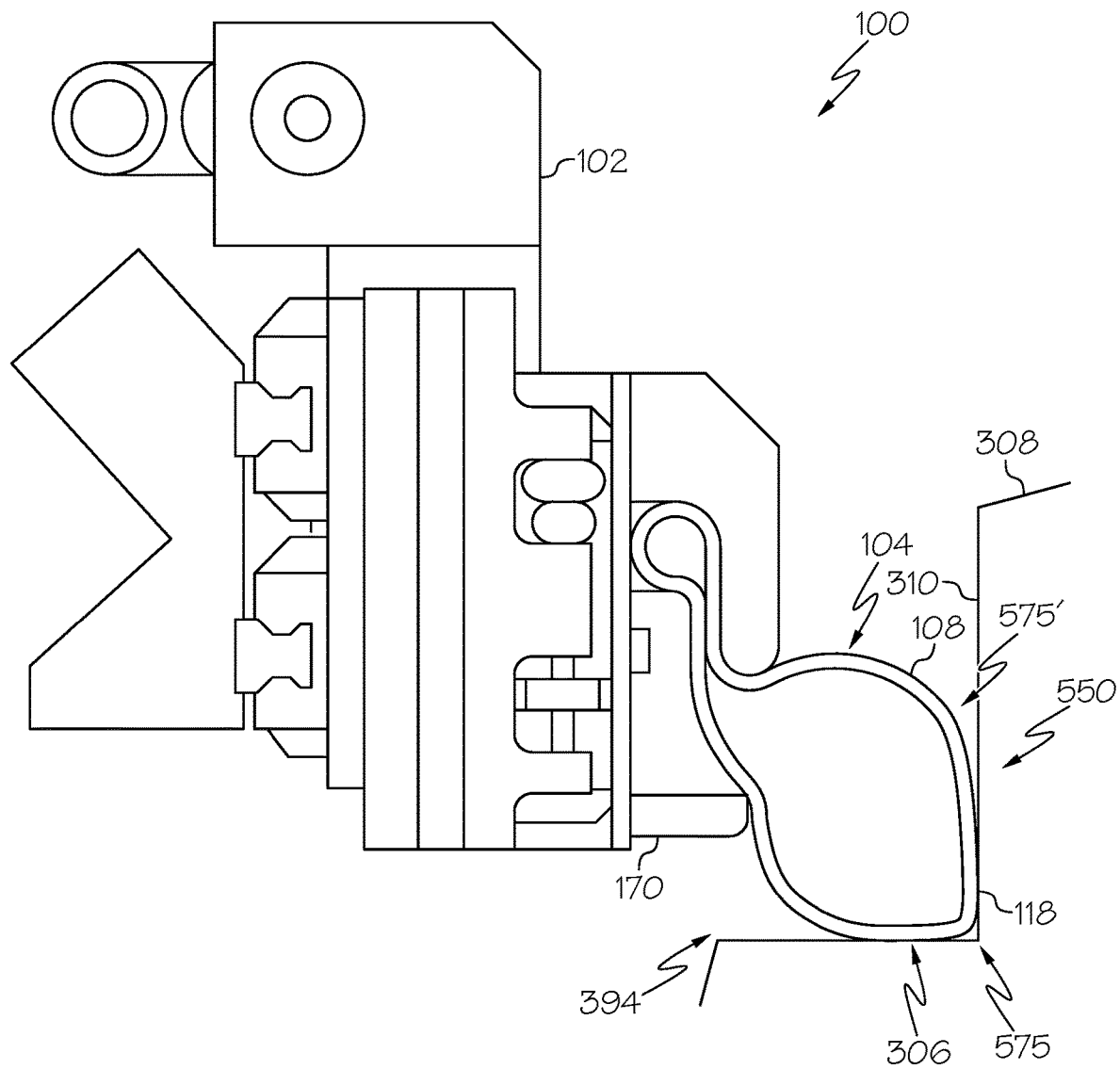
FIG. 3B is a schematic, elevational view of an example of a portion of the composite forming system.

In one or more examples, the forming feature 104, FIG. 3A, is made of natural or synthetic rubber. In one or more examples, the forming feature 104 is made of a fluoroelastomer (e.g., fluorocarbon-based synthetic rubber). In one or more examples, the forming feature 104 is made of silicone. Other materials for the forming feature 104 are also contemplated. In one or more examples, the forming feature 104 is made of a combination of various materials.

Figure 2:
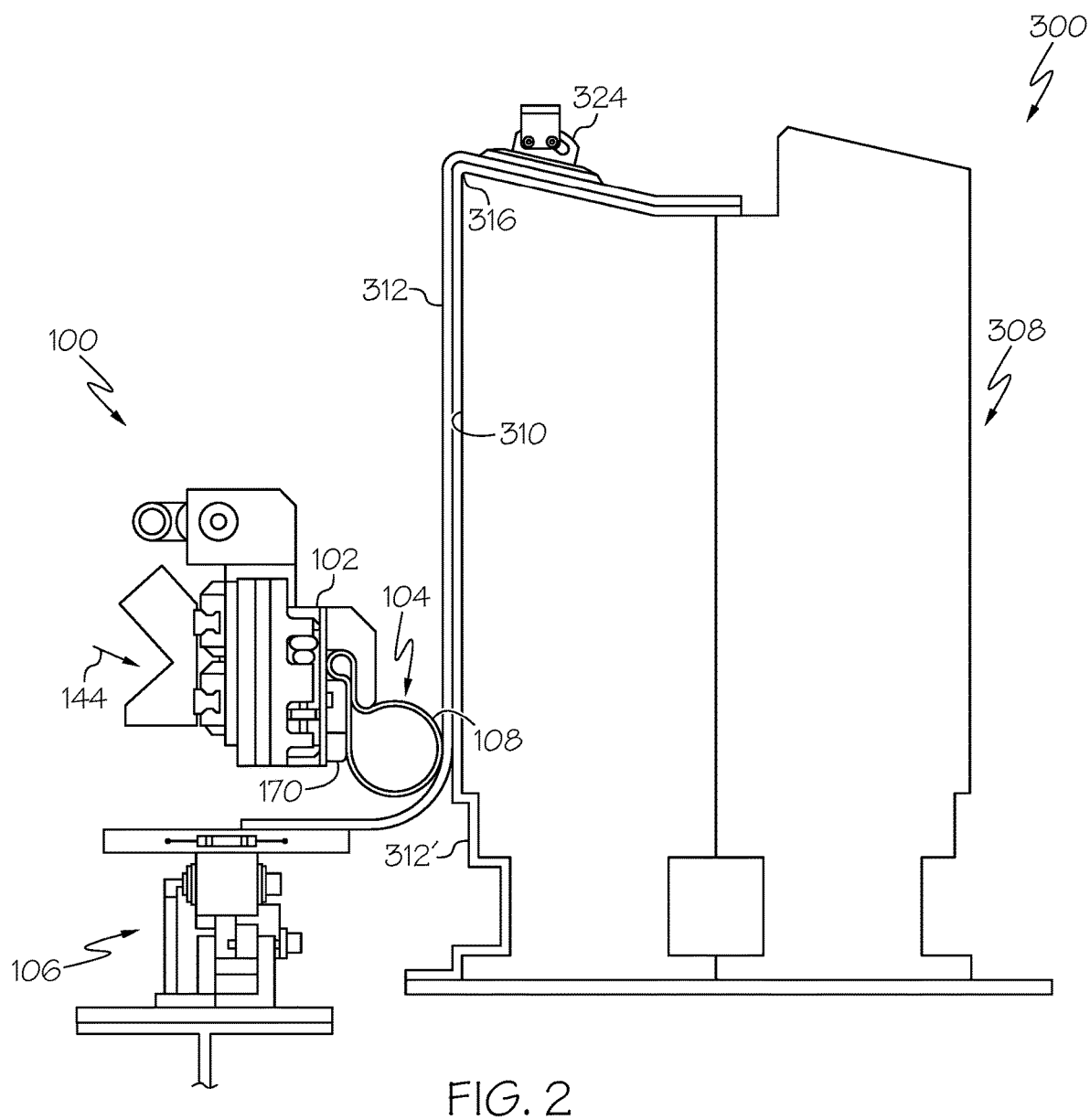
FIG. 2 is a schematic, elevational view of an example of a portion of the composite forming system.

Referring to FIG. 2, the forming feature 104 is coupled to the end effector 102. The end effector 102 moves the forming feature 104 relative to a forming tool 308 to deform a composite ply 312 over a forming surface 310 of the forming tool 308. The positioning member 170 is engageable with the forming feature 104 such that the engagement 550 between the positioning member 170 and the forming feature 104 facilitates a position between the forming feature 104 and the composite ply 312. The positioning member 170 facilitates uniform positioning of the forming feature 104 against the composite ply 312 across non-uniform, curved, joggled, or other irregular shapes of forming surface 310 of forming tool 308. Further, the positioning member facilitates forming the composite ply 312 into any valleys and sweeping the composite ply 312 into the desired contour, thus reducing "bridging" of the composite material 325 over the valleys.

The positioning member 170 is engageable with the forming feature 104 such that engagement 550 between the positioning member 170 and the forming feature 104 facilitates a position 384 between the forming feature 104 and the composite ply 312 to promote uniform application of compaction force 144 over the forming surface 310 of the forming tool 308. The position 384 generally refers to the relationship between the forming feature 104 and positioning member 170. In one example, the positioning member 170 is movable between at least a first position 380 and a second position 382. The positioning member 170 may be segmented and segments may be placed in the first position 380 while other segments may be in the second position 382. Positioning 710, FIG. 10, of the positioning member 170 may be automated or manual. The first position 380 may be when the positioning member 170 is not engaged 550, FIG. 3b, with the forming feature 104, or, alternatively, the first position 380 may be when there is no positioning member 170 present in forming apparatus 100. The second position 382 may be when the positioning member 170 is in engagement 550 with the forming feature 104. The control unit 136 selectively controls positioning 710 of the positioning member 170.

The positioning member 170 may be located behind forming feature 104. For example, each positioning member 170 of the plurality of positioning members 190 may be located behind its associated forming feature 104, and wherein each positioning member 170 of the plurality of positioning members 190 may be independently positionable into engagement 550 with its associated forming feature 104.

In one example, the forming feature 104 assumes a first particular cross-sectional shape 304 when the positioning member 170 is in the first position 380, and the forming feature 104 assumes a different, second cross-sectional shape 306 when the positioning member 170 is in the second position 382. In another example, the cross-sectional shapes 304, 306 of the forming feature 104 are generally dictated by the shape of the forming surface 310 of forming tool 308. For example, if the forming feature 104 is engaged with a portion of a forming surface 310 that is generally the shape of a right angle 575, the forming feature 104 will substantially assume a mating shape 575' to that right angle 575, see FIG. 3B.

Figure 7A:
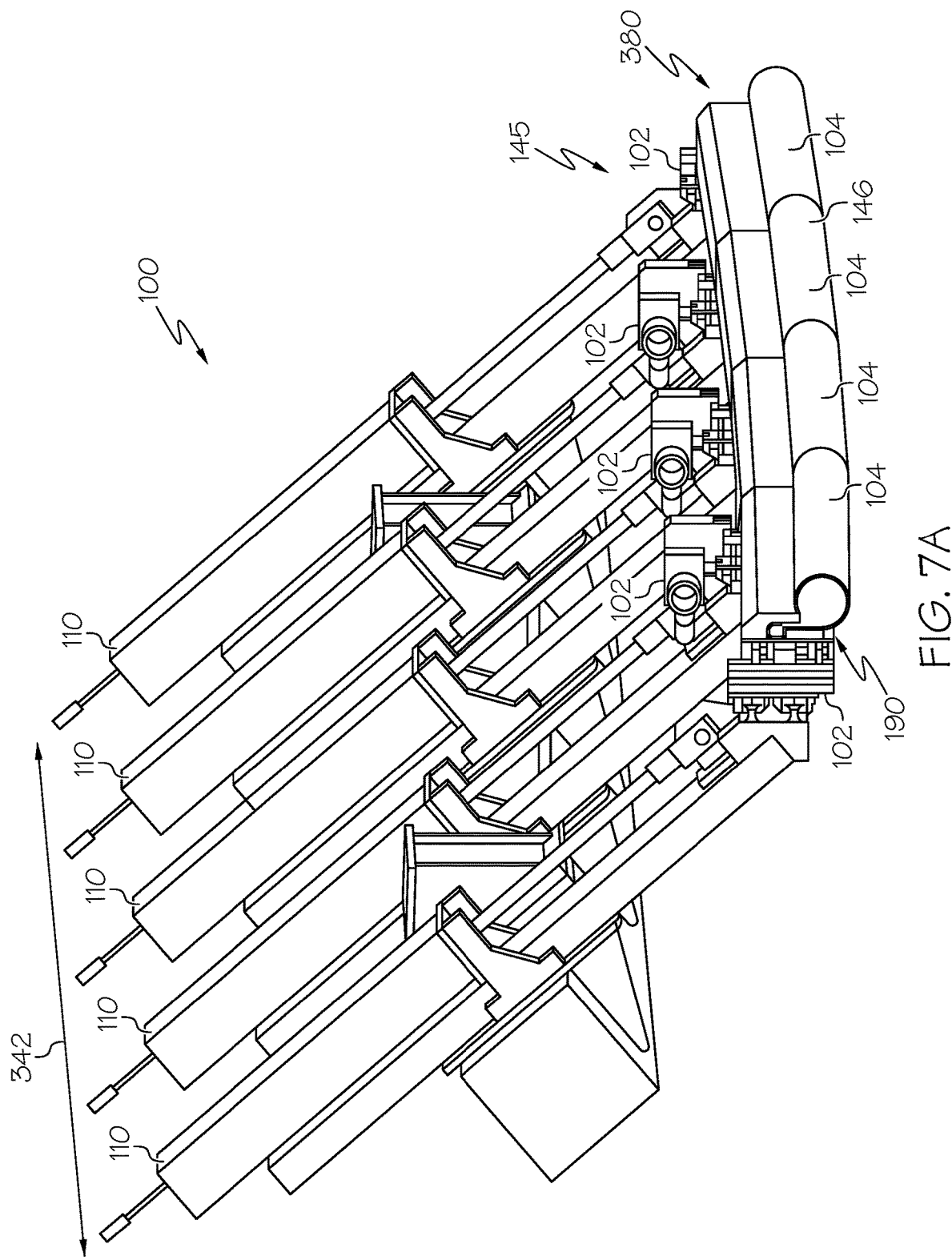
FIG. 7A is a schematic, perspective view of an example of a plurality of composite forming apparatus of the composite forming system.
Figure 7B:
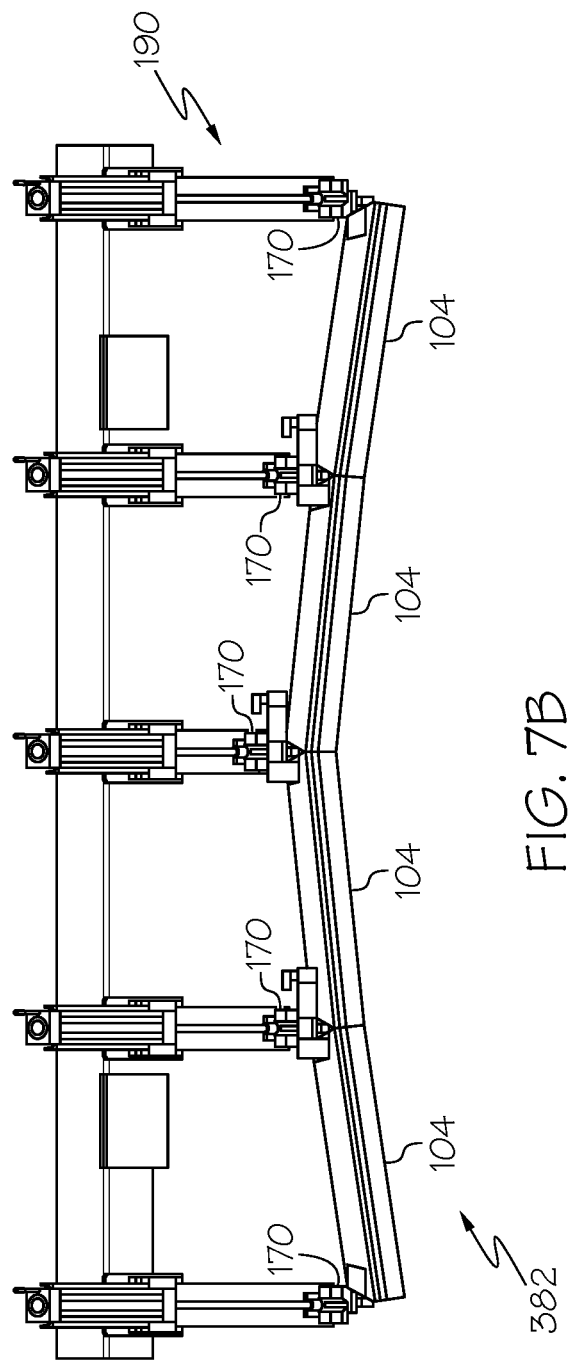
FIG. 7B is a plan view of a plurality of positioning members of the forming apparatus of FIG. 7A.

Referring to FIG. 7, the end effector 102 is one of a plurality of end effectors 145 extending along the longitudinal axis 342. Each end effector 102 of the plurality of end effectors 145 is coupled with an associated forming feature 104. In one example, the positioning member 170 is one of a plurality of positioning members 190 located along the longitudinal axis 342, each positioning member 170 of the plurality of positioning members 190 being engageable with an associated forming feature 104 of the plurality of end effectors 145. In one example, each positioning member 170 of the plurality of positioning members 190, FIG. 7B, is independently movable between at least a first position 380 and a second position 382. In another example, the plurality of positioning members 190 may extend across each associated forming feature 104 or, alternatively, may extend across portions of each associated forming feature 104. For example, while applying compaction force 144, some but not every positioning member 170 of the plurality of positioning members 190 is engaged with its associated forming feature 104.

In one or more examples, each positioning member 170 of the plurality of positioning members 190 is operatively associated with a control unit 136. The control unit 136 automates positioning of each positioning member 170 of the plurality of positioning members 190 based upon geometry of the forming tool 308 or of prior formed composite material 325 on the forming surface 310 of the forming tool. In one example, each positioning member 170 of the plurality of positioning members 190 is independently moveable such that each positioning member 170 may have a different position 384 along the longitudinal axis 342 to achieve uniform application of compaction force 144 across the forming surface 310 or prior formed composite material 325 on the forming surface 310 of the forming tool 308.

In one example, the positioning member 170 is a shim 171. The shim 171 may be manually placed into engagement 550 with the forming feature 104. In another example, placement of the shim 171 may be automated by the control until 136. In another example, the positioning member 170 includes a positioning actuator 173. The positioning actuator 173 may control at least one of a position and an orientation 390 of the forming feature 104. The positioning actuator 173 may be operatively associated with a control unit 136. The control unit 136 facilitates positioning of the positioning member 170 to a desired location and extension, either automated or manually.

The control unit 136 may automate positioning of the positioning actuator 173 based upon sensed data collected, a numerical control program, or a combination thereof. The sensed data may include information about geometry of the forming surface 310 or of prior formed composite material 325 on the forming surface 310 of the forming tool 308 to facilitate uniform application of compaction force 144 is applied across all geometries. For a plurality of positioning members 190, the control unit 136 individually determines and controls positioning of each positioning member 170 of the plurality of positioning members 190 based upon its current location on the forming tool 308. For example, one positioning member 170 of the plurality of positioning members 190 may be fully extended while an adjacent positioning member 170 may be partially extended or may be completely retracted.

In yet another example, the positioning member 170 includes both a shim 171 and a positioning actuator 173 that is configured to actuate the shim 171 into engagement 550 with the forming feature 104. The positioning actuator 173 may be a pneumatic actuator 175 or a hydraulic actuator 177. The positioning actuator 173 may be operatively associated with a servo motor 179. The servo motor 179 may be operatively associated with control unit 136 such that the control unit 136 provides feedback to the servo motor 179 based upon sensed data, a numerical control program, or a combination thereof. The positioning actuator 173 is configured to automatically move the forming feature 104 from a first position 380 to a second position 382 based upon the control unit 136.

Figure 10:
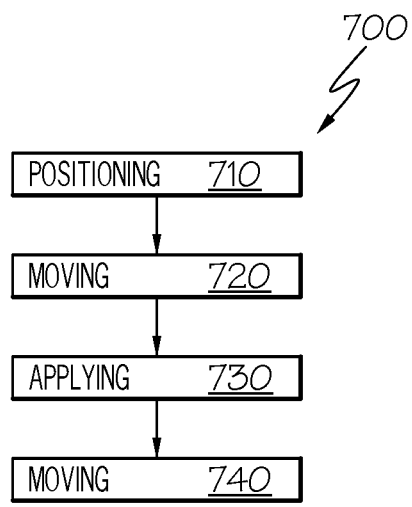
FIG. 10 is a flow diagram of an example of a method for forming a composite.

Referring to FIG. 10, disclosed is a method 700 for manipulating a composite material 325 on a forming tool 308. The method 700 includes positioning 710 a positioning member 170 into engagement 550 with a forming feature 104 to manipulate a position of the forming feature 104, such as pushing a bladder 118 out and away from the end effector 102. The positioning 710 may be manual or automated via a control unit 136. In one example, the positioning 710 includes actuating the positioning member 170 with a positioning actuator 173 into engagement 550 with the forming feature 104.

The method 700 further includes moving 720 the forming feature 104 into engagement with the composite material 325. In one example, the moving 720 is automated. In another example, the positioning 710 is performed simultaneously with the moving 720. In one example, the moving 720 includes sweeping the forming feature 104 across the composite material 325 to conform the composite material 325 to the geometry of the forming tool 308 or, alternatively, over one or more previously formed ply 312'. The moving 720 may include movement along both the horizontal axis 340 and vertical axis 338, see FIG. 4.

The positioning 710 may constantly adjust based upon the geometry of the forming tool 308. The method 700 may further include uniformly applying 730 compaction force 144 to the composite material 325, i.e. the force applied during forming. The positing member 170 facilitates uniform application of compaction force 144 by positioning the forming feature 104 into uniform engagement with the composite material 325 across non-uniform geometries and complex contours of the forming tool 308.

In one example, the method 700 includes moving 740 the positioning member 170 from a first position 380 to a second position 382 to manipulate the forming feature 104 from a first cross-sectional shape 304 to a second cross-sectional shape 306. In another example, the method 700 incudes moving 740 the positioning member 170 from a first orientation 392 to a second orientation 394 to manipulate the forming feature 104 from a first cross-sectional shape 304 to a second cross-sectional shape 306.

In one example, the positioning member 170 is a shim 171. The shim 171 may be manually placed into engagement 550 with the forming feature 104. In another example, placement of the shim 171 may be automated. In another example, the positioning member 170 includes an actuator 173. The actuator 173 may control at least one of a position and an orientation 390 of the forming feature 104. In yet another example, the positioning member 170 includes both a shim 171 and an actuator 173 that is configured to actuate the shim 171 into engagement 550 with the forming feature 104. The actuator 173 may be a pneumatic actuator 175 or a hydraulic actuator 177. The actuator 173 may be operatively associated with a servo motor 179. The actuator 173 is configured to automatically move the forming feature 104 from a first position 380 to a second position 382, see FIG. 7A and FIG. 7B.

Figure 9:
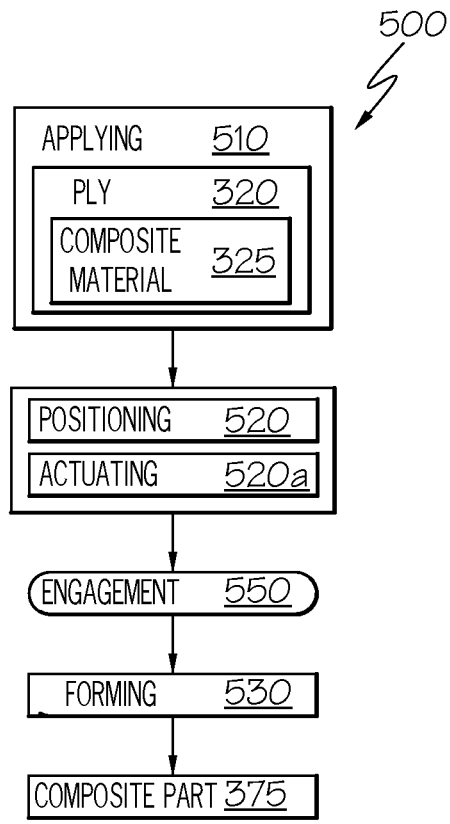
FIG. 9 is a flow diagram of an example of a method for forming a composite.

Referring to FIG. 9, disclosed is a method 500 for forming a composite part 375. The method 500 includes applying 510 at least one ply 320 of composite material 325 over a forming surface 310 of a forming tool 308 or over a previously formed ply 312' of composite material 325. Each ply 320 of composite material 325 applied 510 assumes the shape of the forming tool 308, or previously formed ply 312' of composite material 325 over the forming tool 308.

Referring to FIG. 9, the method 500 includes positioning 520 a positioning member 170 into engagement 550 with a forming feature 104. In one example, the positioning 520 includes actuating 220a the positioning member 170 into engagement 550 with the forming feature 104. The positioning 520 may include moving the positing member 170 from a first position 380 to a second position 382. The shape and size of the positioning member 170 may change based upon the forming feature 104, forming tool 308, amount of composite material 325 applied, etc.

After the positioning 520, the method 500 includes forming 530 the at least one ply 320 of composite material 325 over the forming surface 310 of the forming tool 308 with the forming feature 104. The forming 530 includes forming the least one ply 320 of composite material 325 to the contours of the forming surface 310 or of previously formed ply 312' of composite material 325 over the forming surface 310. The forming 530 may include moving the forming feature 104 across the forming surface 310 of the forming tool 308. During the forming 530, each positioning member 170 of a plurality of positioning member 190 may move independently between at least a first position 380 and a second position 382 to conform to the geometry of the forming tool 308.

In one example, the forming tool 308 is a spar forming tool. In another example, the forming tool 308 is a stringer forming tool. In yet another example, the forming tool 308 is a hat stringer forming tool. The forming surface 310 of the forming tool 308 may include one or more curve, ramp, ply drop, ridge, contour, and joggle.

Figure 4:
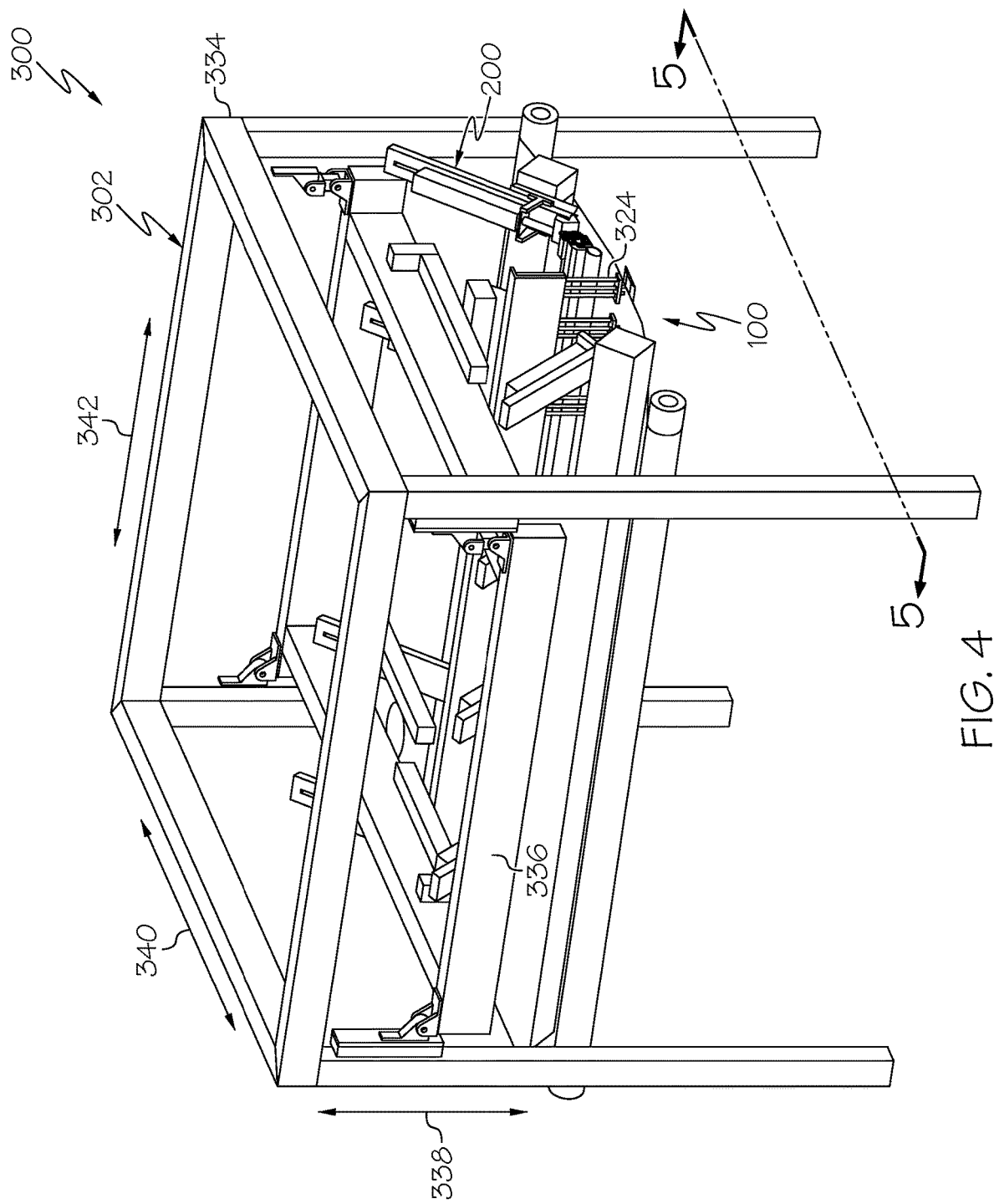
FIG. 4 is a schematic, perspective view of an example of a composite forming system.

Referring generally to FIGS. 1-8, in one or more examples, composite forming system 300 includes movement mechanism 302, the end effector 102, the forming feature 104, and the positioning member 170. FIG. 4 illustrates an exemplary overview of composite forming system 300.

Referring to FIG. 4, the end effector 102 is coupled to the movement mechanism 302. The forming feature 104 is coupled to the end effector 102. Referring to FIG. 2, the positioning member 170 is coupled to the forming feature 104. The end effector 102 selectively positions and moves the forming feature 104 relative to the forming surface 310 of the forming tool 308 to apply the compaction force 144 to the composite ply 312, see FIG. 3A. The movement mechanism 302 selectively positions and moves the end effector 102 relative to the forming surface 310 of the forming tool 308 to form a portion of the composite ply 312 over a portion of the forming surface 310 using the forming feature 104. The positioning member 170 selectively positions and moves the forming feature 104 relative to the forming surface 310 of the forming tool 308 to apply uniform compaction force 144 to the composite ply 312 across non-uniform tool geometries.

Referring to FIG. 4, in one or more examples, the movement mechanism 302 moves and selectively positions the end effector 102 along a plurality of movement axes, including a first axis 338, a second axis 340 that is perpendicular to the first axis 338, and a third axis 342 that is perpendicular to the first axis 338 and the second axis 340. In the illustrative examples, the first axis 338 (e.g., a vertical axis) is approximately vertical and the second axis 340 (e.g., a horizontal axis) and the third axis 342 (e.g., a longitudinal axis) are approximately horizontal.

Still referring to FIG. 4, in one or more example, the movement mechanism 302 includes a frame 334. In one or more examples, the frame 334 is generally rectangular in shape. In one or more examples, the frame 334 is an overhead frame and the forming tool 308 is positioned under the frame 334 during the layup operation. Generally, the frame 334 defines the first axis 338, the second axis 340, and the third axis 342. In one or more examples, the movement mechanism 302 includes a carriage 336. The carriage 336 is coupled to the frame 334. The frame 334 surrounds the carriage 336. In one or more examples, the carriage 336 has a shape that is generally the same as the frame 334 but is smaller such that the carriage 336 nests within the frame 334. In one or more examples, the carriage 336 is movable relative to the frame 334. In one or more examples, the carriage 336 is pivotably movable and/or rotationally movable about the first axis 338, the second axis 340, and/or the third axis 342. In one or more examples, the carriage 336 is linearly movable along the first axis 338, the second axis 340, and/or the third axis 342. In one or more examples, the end effector 102 is coupled to the carriage 336. Movement of the carriage 336 moves and selectively positions the end effector 102 relative to the forming tool 308 to accommodate the geometry or configuration of the forming tool 308 and achieve a best fit position for the end effector 102.

Referring to FIG. 4, in one or more examples, the end effector 102 is movable relative to the movement mechanism 302, such as relative to the carriage 336. In one or more examples, the end effector 102 is linearly movable relative to the movement mechanism 302. In one or more examples, the end effector 102 is rotationally movable relative to the movement mechanism 302.

Referring to FIG. 1, in one or more examples, the composite forming apparatus 100 includes an actuator 110. The actuator 110 is coupled to, or forms a portion of, the end effector 102. In one or more examples, the actuator 110 is, or includes, a linear actuator and the actuator 110 linearly moves the end effector 102 or the forming feature 104 relative to the carriage 336 to position the forming feature 104 into contact with the composite ply 312. In one or more examples, the actuator 110 is, or includes, a rotary actuator and the actuator 110 rotationally moves the end effector 102 or the forming feature 104 relative to the carriage 336 to angularly orient the forming feature 104 relative to the forming tool 308 and position the forming feature 104 into contact with the composite ply 312. In one or more examples, the actuator 110 is selectively controlled, for example, by the control unit 136, to control the position of the forming feature 104 and, thus, the compaction force 144 applied to the composite ply 312 by the forming feature 104.

Still referring to FIG. 1, in one or more examples, the actuator 110 is any one of various suitable types of controllable actuators. In an example, the actuator 110 is a pneumatic actuator. In an example, the actuator 110 is a hydraulic actuator. In an example, the actuator 110 is a mechanical actuator.

In one or more examples, the sensor 140 is coupled to, or is in communication with, the actuator 110. In one or more examples, the sensor 140 detects at least one of a stroke position of the actuator 110 and a force acting on the actuator 110, which is used to determine the position of the forming feature 104 and to control the compaction force 144 for precise forming on the forming tool 308 having a complex geometry or surface contour.

In one or more examples, the control unit 136 is, or includes, a numerical control (NC) unit. In these examples, the control unit 136 operates in accordance with a numerical control program and in conjunction with data (e.g., collected, received, and analyzed) from the sensor 140 to determine proper movement and position of the end effector 102 relative to the forming tool 308.

Referring to FIG. 1, in one or more examples, the composite forming system 300 includes the ply support member 106 that is movable relative to the forming tool 308 and relative to the composite forming composite forming apparatus 100 to support the portion of the composite ply 312, which extends beyond an edge 316 of the forming tool 308.

In one or more examples, the ply support member 106 is coupled to the end effector 102. In these examples, the ply support member 106 is movable with the end effector 102, such as by the carriage 336, relative to the forming tool 308. In these examples, the ply support member 106 may also be movable relative to the end effector 102. In one or more examples, the ply support member 106 is coupled to the movement mechanism 302, such as to the carriage 336. In these examples, the ply support member 106 is movable relative to the carriage 336, relative to the end effector 102, and relative to the forming tool 308. In one or more examples, movement mechanism 302 includes a drive mechanism dedicated to the ply support member 106 such that the ply support member 106 moves and is selectively positioned relative to the forming tool 308 independent of the carriage 336 and/or the end effector 102.

Referring to FIG. 1, in one or more examples, the composite forming system 300 includes a second composite forming apparatus 200. The second composite forming apparatus 200 is coupled to the movement mechanism 302. The second composite forming apparatus 200 is spaced away from the composite forming composite forming apparatus 100. The movement mechanism 302 selectively positions and moves the second composite forming apparatus 200 to form and compact the composite ply 312 over the forming surface 310.

Examples of the second composite forming apparatus 200 are substantially the same as the examples of the composite forming apparatus 100 described herein above and illustrated in FIGS. 1-6. In one or more examples, the second composite forming apparatus 200 includes a second end effector 202, a second forming feature 204, and a second positioning member 270, which may include a second shim 172, and/or may further include a second positioning actuator 273.

Examples of the second end effector 202, the second forming feature 204, and the second positioning member 270 are substantially the same as the examples of the end effector 102, the forming feature 104, and the positioning member 170 described herein above. The second forming feature 204 is coupled to the second end effector 202. The second positioning member 270 is coupled to the second forming feature 204. The second positioning member 270 abuts the second forming feature 204. The second end effector 202 moves the second forming feature 204 relative to the forming tool 308 to form the composite ply 312 over the forming surface 310 of the forming tool 308. The second positioning member 270 uniformly positions the second forming feature 204 against the composite ply 312 before and/or while the composite ply 312 is formed over the forming surface 310 of the forming tool 308.

Referring still to FIGS. 1 and 7-10, in one or more examples, the composite forming system 300 includes the second end effector 202, the second forming feature 204, and the second positioning member 270. The second end effector 202 is coupled to the movement mechanism 302, such as to the carriage 336. The second forming feature 204 is coupled to the second end effector 202. The second positioning member 270 is coupled to the second forming feature 204. The second end effector 202 selectively moves the second forming feature 204 relative to the forming surface 310 of the forming tool 308 to apply a second compaction force 244 to the composite ply 312. The movement mechanism 302 selectively moves the second end effector 202 relative to the forming surface 310 of the forming tool 308 to form a second portion of the composite ply 312 over a second portion of the forming surface 310 using the second forming feature 204. The second positioning member 270 selectively moves the second forming feature 204 relative to the forming surface 310 of the forming tool 308 to apply uniform second compaction force 244 to the composite ply 312 across non-uniform tool geometries.

Referring to FIGS. 1 and 10, in one or more examples, the composite forming system 300 includes a second ply support member 206. Examples of the second ply support member 206 are substantially the same as the examples of the ply support member 106 described herein above and illustrated in FIGS. 1-3. In one or more examples, the second ply support member 206 is movable relative to the forming tool 308. In one or more examples, the second ply support member 206 is movable relative to the second end effector 202 and/or the second forming feature 204. The second ply support member 206 supports the second portion of the composite ply 312, which extends beyond a second edge 326 of the forming tool 308.

Referring to FIGS. 1, 8, and 10, in one or more examples, the composite forming system 300 includes the stomp foot 324. In one or more examples, the stomp foot 324 is coupled to the movement mechanism 302, such as to the carriage 336. The stomp foot 324 is movable relative to the movement mechanism 302 to press the composite ply 312 against the forming surface 310 of the forming tool 308 before and/or while the composite ply 312 is formed over the forming surface 310 of the forming tool 308 using the forming feature 104 and/or the second forming feature 204, see FIG. 5.

Figure 5:
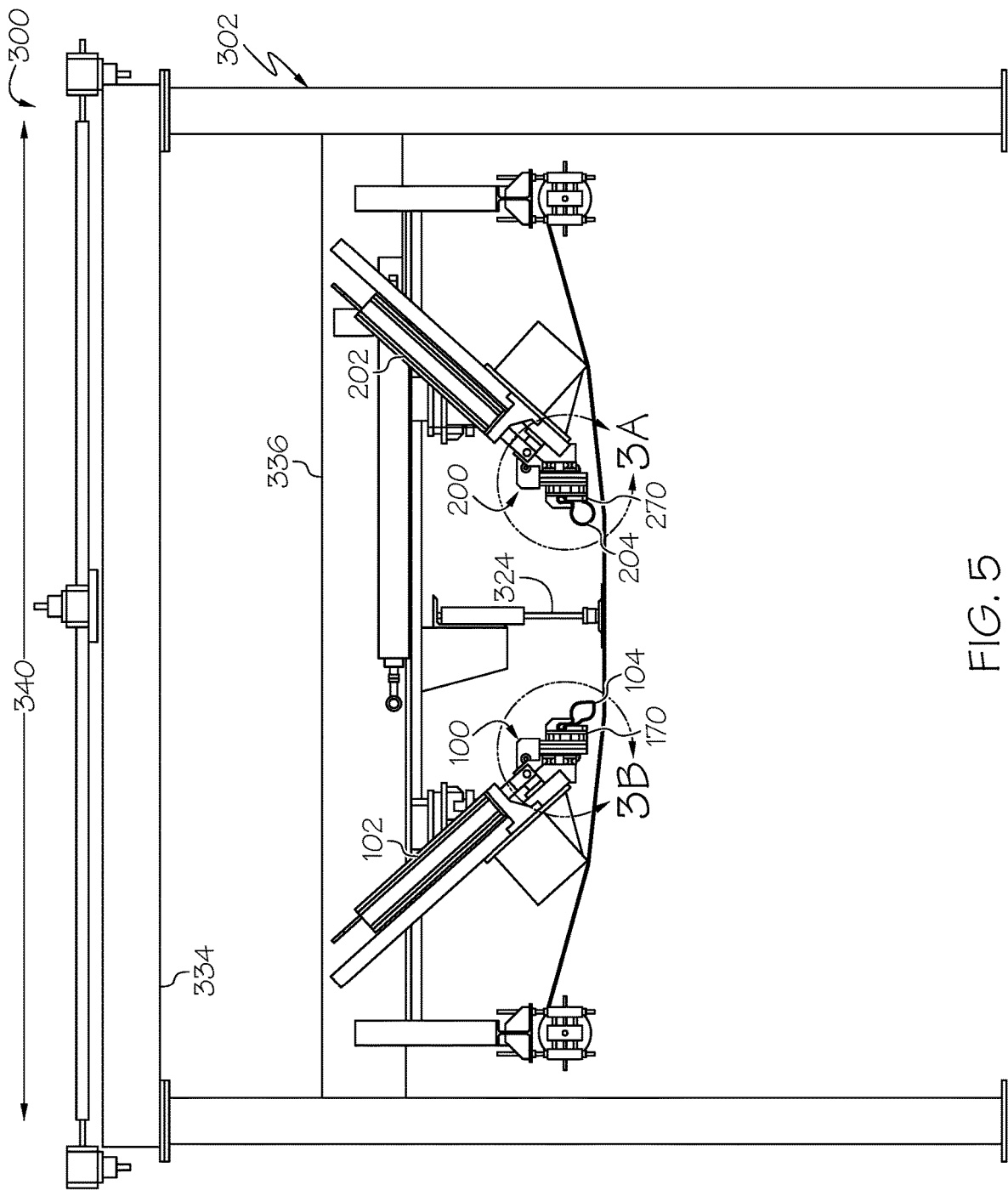
FIG. 5 is a schematic, elevational view of an example of the composite forming system.

Referring to FIGS. 4 and 5, in one or more examples, the stomp foot 324 is located between the composite forming apparatus 100 (e.g., the end effector 102) and the second composite forming apparatus 200 (e.g., the second end effector 202). In one example, the stomp foot 324 is actuated into engagement with the composite material 325.

Referring to FIGS. 1 and 3, in one or more examples, the second forming feature 204 (e.g., the body 108) includes or takes the form of any forming member that is suitable for or that is capable of forming the composite ply 312 over the forming surface 310 and compacting the composite ply 312 against the forming surface 310.

Referring to FIG. 1, in one or more examples, the second forming feature 104 includes, or takes the form of, the bladder 118. The bladder 118 is inflatable. The bladder 118 is configured to move between at least two positions based upon location of the positioning member 170. Inflation pressure of the bladder 118 facilitates engagement 550 and conforming of the forming feature 104 with the forming surface 310 of the forming tool 308 or previously formed ply 312' over the forming surface 310 of the forming tool 308. For example, reducing inflation pressure of the bladder 118 facilitates the forming feature 104 ability to conform to complex geometries. Further, adjustment of inflation pressure may be automated such that it is optimized for the particular geometry of the forming surface 310. Inflation pressure may automatically be reduced for complex forming surface 310 shapes to apply uniform compaction force 144 and to prevent bridging over valleys of the forming surface 310. Similarly, inflation pressure may automatically increase across a portion of the forming surface 310 that is more uniform and planar.

Referring still to FIG. 1, in one or more examples, the second forming feature 204 includes, or takes the form of, a wiper. In one or more examples, the second forming feature 204 includes, or takes the form of, a finger. In other examples, the second forming feature 204 includes, or takes the form of, any one of various other forming members having various shapes, geometries, and/or configurations. For example, the body 108 of the second forming feature 204 may be a bead of material, such as a bead of silicone, rubber, and the like.

Referring to FIG. 1, in one or more examples, the second forming feature 204 is made of any material that is suitable for contact with the composite ply 312 in order to form the composite ply 312 over the forming surface 310 and compact the composite ply 312 against the forming surface 310. In one or more examples, the second forming feature 204 is made of a material that is capable of withstanding heat and transferring heat when the second forming feature 204 is in contact with the composite ply 312. In one or more examples, the second forming feature 204 is made of a material that is flexible. In one or more examples, the second forming feature 204 is made of a fluoroelastomer. In one or more examples, the second forming feature 204 is made of silicone.

Referring to FIGS. 7 and 8, in one or more examples, the second end effector 202 is movable relative to the movement mechanism 302, such as relative to the carriage 336. In one or more examples, the second end effector 202 is linearly movable relative to the movement mechanism 302. In one or more examples, the second end effector 202 is rotationally movable relative to the movement mechanism 302.

In one or more examples, the second composite forming apparatus 200 includes a second actuator 210. The second actuator 210 is coupled to, or forms a portion of, the second end effector 202. In one or more examples, the second actuator 210 is, or includes, a linear actuator and the second actuator 210 linearly moves the second end effector 202 or the second forming feature 204 relative to the carriage 336 to position the second forming feature 204 into contact with the composite ply 312. In one or more examples, the second actuator 210 is, or includes, a rotary actuator and the second actuator 210 rotationally moves the second end effector 202 or the second forming feature 204 relative to the carriage 336 to angularly orient the second forming feature 204 relative to the forming tool 308 and position the second forming feature 204 into contact with the composite ply 312. In one or more examples, the second actuator 210 is selectively controlled, for example, by the control unit 136, to control the position of the second forming feature 204 and, thus, the second compaction force 244 applied to the composite ply 312 by the second forming feature 204.

Referring to FIG. 1, in one or more examples, the composite forming system 300 includes the control unit 136. The control unit 136 may be coupled to (e.g., in communication with) the positioning member 170. The control unit 136 is configured to analyze data collected from one or more sensor 140 to determine movement within the system 300.

Referring still to FIG. 1, in one or more examples, the second composite forming apparatus 200 includes a second sensor 240. In one or more examples, the second sensor 240 is a pressure sensor or a load cell that detects a force or a load applied to the second forming feature 204. In one or more examples, the second sensor 240 is a position sensor that detects a relative position of the second forming feature 204.

In one or more examples, the control unit 136 is coupled to (e.g., is in communication with) the second end effector 202 and the second sensor 240. The control unit 136 selectively controls movement of the second end effector 202 based on a second sensor signal 242 provided by the second sensor 240 to appropriately position the second forming feature 204 such that the second compaction force 244 is applied to the composite ply 312 using the second forming feature 204 at a constant magnitude.

Figure 6:
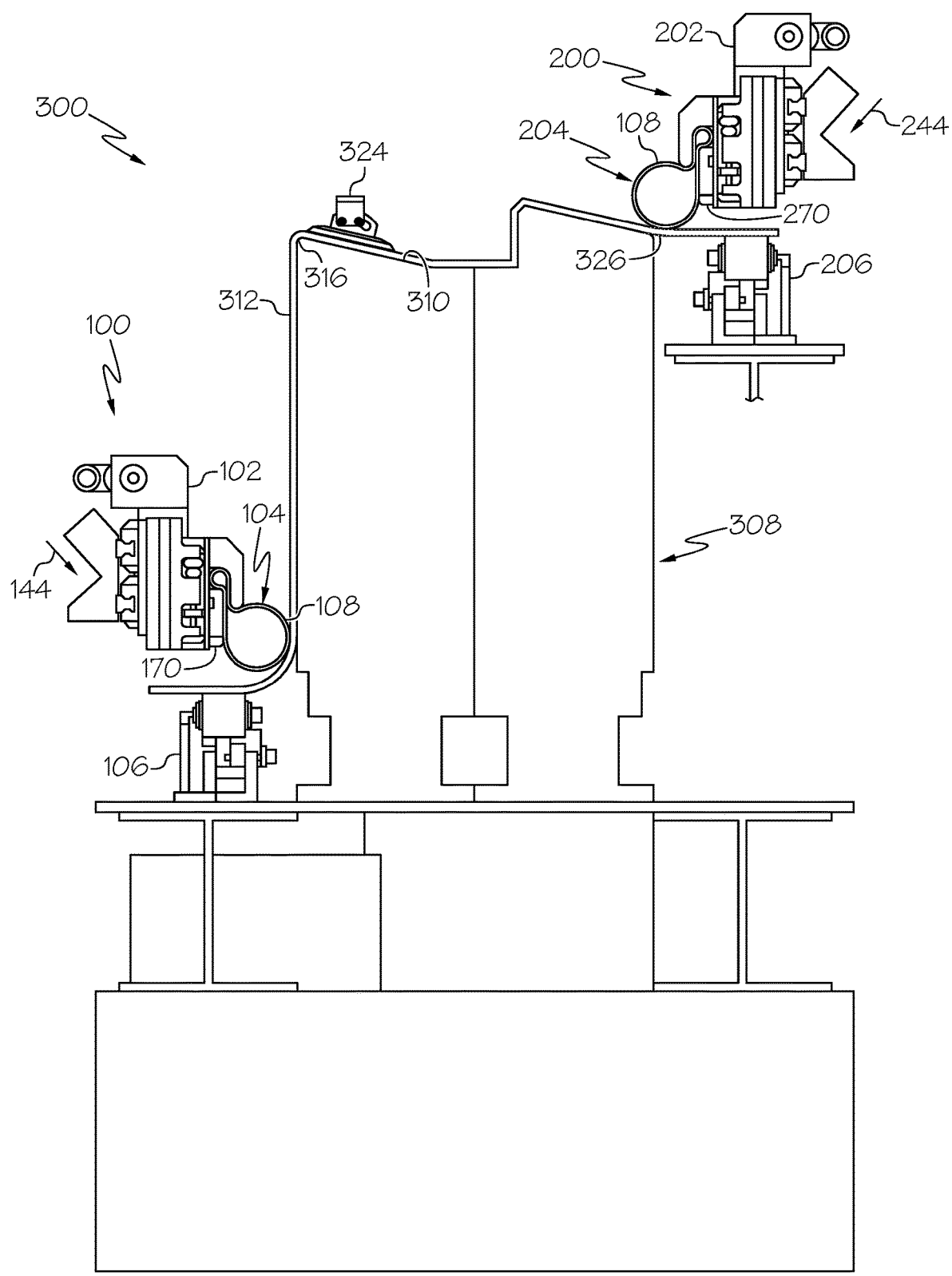
FIG. 6 is a schematic, elevational view of an example of a portion of the composite forming system.

Referring to FIGS. 1, 8, and 9, in one or more examples, the composite forming system 300 includes a plurality of composite forming apparatus 100 (e.g., as illustrated in FIG. 6). In one or more examples, the composite forming system 300 includes a plurality of second composite forming apparatus 200 (e.g., as shown in FIG. 9). Each one of the plurality of composite forming apparatus 100 is coupled to the movement mechanism 302. Each one of the plurality of second composite forming apparatus 200 is coupled to the movement mechanism 302.

Referring to FIG. 8, in one or more examples, the composite forming system 300 includes a plurality of end effectors 145, a plurality of forming features 104, and a plurality of positioning members 190. Each one of the plurality of end effectors 145 is coupled to the movement mechanism 302, such as to the carriage 336. Each one of the plurality of forming features 104 is coupled to a corresponding one of the plurality of end effectors 145. Each one of the plurality of positioning members 190 is coupled to a corresponding one of the plurality of forming features 104, or associated forming feature 104. Each one of the plurality of end effectors 145 selectively positions and moves a corresponding one of the plurality of forming features 104 relative to the forming surface 310 of the forming tool 308 to apply the compaction force 144 to the composite ply 312. The movement mechanism 302 selectively positions and moves each one of the plurality of end effectors 145 relative to the forming surface 310 of the forming tool 308 to form a portion of the composite ply 312 over a portion of the forming surface 310 using a corresponding one of the plurality of forming features 104.

In one or more examples, the composite forming system 300 includes a plurality of sensors 140. Each one of the plurality of sensors 140 detects at least one of a force applied to and a relative position of a corresponding one of the plurality of forming features 104. In one or more examples, the control unit 136 is coupled to (e.g., is in communication with) each one of the plurality of end effectors 145 and each one of the plurality of sensors 140. The control unit 136 selectively controls movement of each one of the plurality of end effectors 145 based on the sensor signal 142 provided by a corresponding one of the plurality of sensors 140 to apply the compaction force 144 at a constant magnitude to the composite ply 312 using a corresponding one of the plurality of forming features 104.

In one or more examples, the plurality of forming features 104 form an interface surface 146 that is substantially continuous for contact with the composite ply 312. For example, each one of the plurality of forming features 104 abuts a directly adjacent one of the plurality of forming features 104 to form the substantially continuous interface surface 146 for contact with the composite ply 312.

Referring to FIG. 9, in one or more examples, the composite forming system 300 includes a plurality of second end effectors 245, a plurality of second forming features 204, and a plurality of second positioning members 290. Each one of the plurality of second end effectors 245 is coupled to the movement mechanism 302, such as to the carriage 336. Each one of the plurality of second forming features 204 is coupled to a corresponding one of the plurality of second end effectors 245. Each one of the plurality of second positioning members 290 is coupled to a corresponding one of the plurality of second forming features 204. Each one of the plurality of second end effectors 245 selectively positions and moves a corresponding one of the plurality of second forming features 204 relative to the forming surface 310 of the forming tool 308 to apply the second compaction force 244 to the composite ply 312. The movement mechanism 302 selectively positions and moves each one of the plurality of second end effectors 245 relative to the forming surface 310 of the forming tool 308 to form a portion of the composite ply 312 over a portion of the forming surface 310 using a corresponding one of the plurality of second forming features 204.

In one or more examples, the composite forming system 300 includes a plurality of second sensors 240. Each one of the plurality of second sensors 240 detects at least one of a force applied to and a relative position of a corresponding one of the plurality of second forming features 204. In one or more examples, the control unit 136 is coupled to (e.g., is in communication with) each one of the plurality of second end effectors 245 and each one of the plurality of second sensors 240. The control unit 136 selectively controls movement of each one of the plurality of second end effectors 245 based on a second sensor signal 242 provided by a corresponding one of the plurality of second sensors 240 to apply the second compaction force 244 at a constant magnitude to the composite ply 312 using a corresponding one of the plurality of second forming features 204.

In one or more examples, the plurality of second forming features 204 form a second interface surface 246 that is substantially continuous for contact with the composite ply 312. For example, each one of the plurality of second forming feature 204 abuts a directly adjacent one of the plurality of second forming features 204 to form the substantially continuous second interface surface 246 for contact with the composite ply 312.

In one or more examples, the composite forming system 300 is one of a plurality of sub-systems of a larger automated composite manufacturing system. Each one of the plurality of sub-systems facilitates and corresponds to a different fabrication operation associated with the manufacture of the composite structure 314 (e.g., a composite part). The sub-systems of the automated composite manufacturing system are interlinked and cooperate to automate at least a portion of the fabrication process.

For example, the automated composite manufacturing system utilizes a plurality of semi-automated or fully automated sub-systems to perform ply-by-ply formation and compaction of individual composite plies 312 on the forming tool 308. For the purpose of the present disclosure, ply-by-ply formation refers to sequential layup of a number of composite plies 312 on the forming tool 308 according to a predetermined sequence. For the purpose of the present disclosure, layup refers to placement of the composite ply 312 on at least a portion of the forming tool 308, compaction of the composite ply 312 against the forming surface 310 of the forming tool 308, and formation of at least a portion of the composite ply 312 over at least a portion of the forming surface 310. During or subsequent to layup, the number of composite plies 312 is compacted on the forming tool 308, such as individually after each composite ply 312 has been laid down or after more than one composite ply 312 had been laid down.

Figure 11:
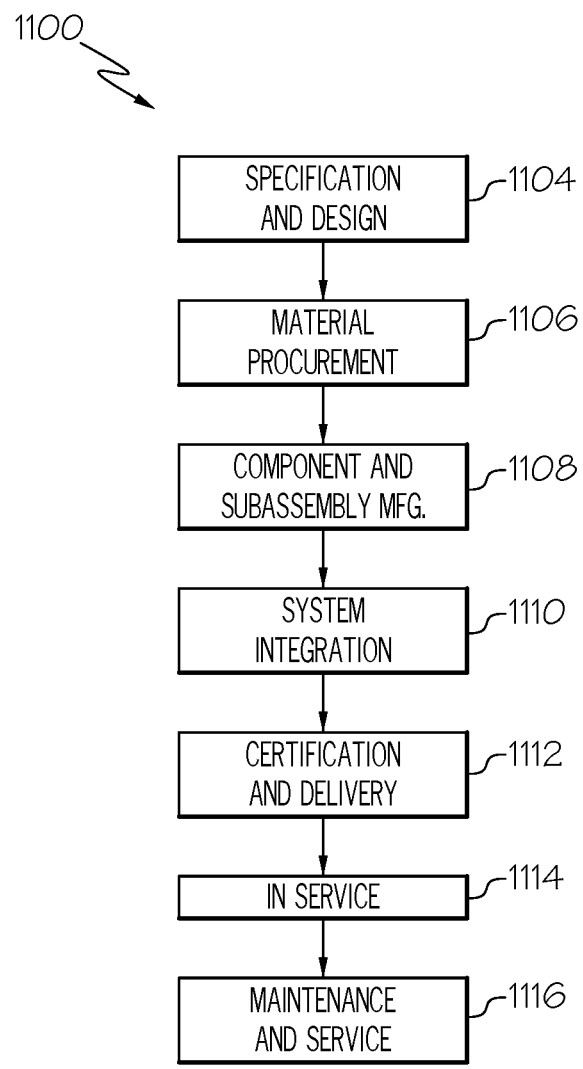
FIG. 11 is a flow diagram of an example of an aircraft manufacturing and service method.
Figure 12:
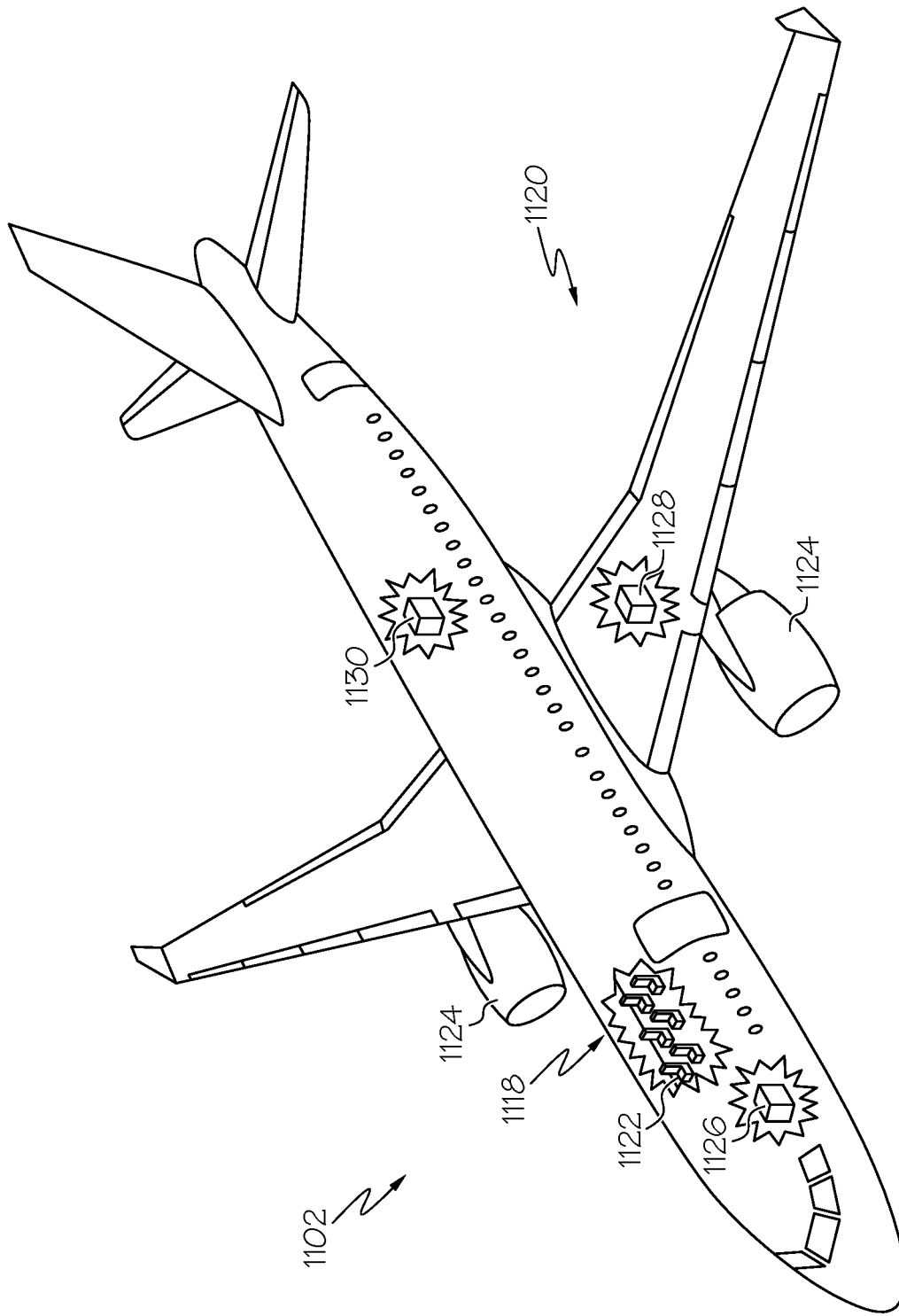
FIG. 12 is a schematic illustration of an example of an aircraft.

Referring now to FIGS. 11 and 12, examples of the composite forming apparatus 100, the composite forming system 300, the methods 500 and 700, and the composite structure 314 may be related to, or used in the context of, an aircraft manufacturing and service method 1100, as shown in the flow diagram of FIG. 11 and an aircraft 1102, as schematically illustrated in FIG. 12. For example, the aircraft 1102 and/or the aircraft production and service method 1100 may utilize the composite structure 314 that is made using the composite forming apparatus 100 or the composite forming system 300, described herein and illustrated in FIGS. 1-10, and/or according to the methods 500 and 700.

The present disclosure recognizes that composite structures can be advantageous in the manufacture of aircraft to decrease the weight of the aircraft and provide longer service life for various components of the aircraft. In manufacturing composite structures, layers of composite material are typically laid up on a tool. Often, each layer of composite material includes a fiber sheet that is infused or pre-impregnated with a matrix material. The different layers of composite material may be laid up in different orientations, and different numbers of layers may be used depending on the performance requirements of the composite structure being manufactured. Due to size, geometry, and/or complexity of composite structure, layup of the layers of composite material may be more difficult or more labor intensive than desired. The examples of the composite forming apparatus 100, the composite forming system 300, and the methods 500 and 700 improve upon production speed, conformity, and manufacturability of such composite structures.

Referring to FIG. 12, examples of the aircraft 1102 may include an airframe 1118 having the interior 1122. The aircraft 1102 also includes a plurality of high-level systems 1120. Examples of the high-level systems 1120 include one or more of a propulsion system 1124, an electrical system 1126, a hydraulic system 1128, and an environmental system 1130. In other examples, the aircraft 1102 may include any number of other types of systems, such as a communications system, a flight control system, a guidance system, a weapons system, and the like. In one or more examples, the composite structure 314 made using the composite forming apparatus 100 or the composite forming system 300 and/or according to the methods 500 and 700 forms a component of the airframe 1118, such as a wing, a fuselage, a panel, a stringer, a spar, and the like.

Referring to FIG. 11, during pre-production, the method 1100 includes specification and design of the aircraft 1102 (block 1104) and material procurement (block 1106). During production of the aircraft 1102, component and subassembly manufacturing (block 1108) and system integration (block 1110) of the aircraft 1102 take place. Thereafter, the aircraft 1102 goes through certification and delivery (block 1112) to be placed in service (block 1114). Routine maintenance and service (block 1116) includes modification, reconfiguration, refurbishment, etc. of one or more systems of the aircraft 1102.

Each of the processes of the method 1100 illustrated in FIG. 11 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the composite forming apparatus 100, the composite forming system 300, and the methods 500 and 700 shown and described herein may be employed during any one or more of the stages of the manufacturing and service method 1100 shown in the flow diagram illustrated by FIG. 11. In an example, manufacture of the composite structure 314 in accordance with the methods 500 and 700 and/or using the composite forming apparatus 100 or the composite forming system 300 may form a portion of component and subassembly manufacturing (block 1108) and/or system integration (block 1110). Further, the composite structure 314 manufactured in accordance with the methods 500 and 700 and/or using the composite forming apparatus 100 or the composite forming system 300 may be utilized in a manner similar to components or subassemblies prepared while the aircraft 1102 is in service (block 1114). Also, the composite structure 314 manufactured in accordance with the methods 500 and 700 and/or using the composite forming apparatus 100 or the composite forming system 300 may be utilized during system integration (block 1110) and certification and delivery (block 1112). Similarly, manufacture of the composite structure 314 in accordance with the methods 500 and 700 and/or using the composite forming apparatus 100 or the composite forming system 300 may be utilized, for example and without limitation, while the aircraft 1102 is in service (block 1114) and during maintenance and service (block 1116).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to structural component assemblies and systems and methods of making the same for other types of vehicles (e.g., land vehicles, marine vehicles, space vehicles, etc.) and stand-alone structures.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the composite forming apparatus 100, the composite forming system 300, the methods 500 and 700, and the composite structure 314 have been shown and described, modifications may occur to those skilled in the art upon reading the specification. The present application includes such modifications and is limited only by the scope of the claims.

What is claimed is:

1. A composite forming apparatus for manipulating a composite material, the composite forming apparatus comprising:
   a stomp foot selectively moveable between a stomp position and another position, the stomp foot pressing a composite ply against a forming surface of a forming tool in the stomp position;
   a forming feature selectively moveable to a sweeping position, the forming feature engaging with the composite ply in the sweeping position after the composite ply is pressed against the forming surface and sweeping the composite ply relative to the forming tool away from the stomp foot and toward a ply support member beyond the forming tool to form the composite ply over the forming tool; and
   a positioning member selectively moveable in relation to the forming feature and positioning the forming feature in relation to the composite ply during the sweeping in response to selective movement of the positioning member.

2. The composite forming apparatus of claim 1, wherein the positioning member controls at least one of a position, a profile and an orientation of the forming feature.

3. The composite forming apparatus of claim 1, wherein the positioning member comprises a shim.

4. The composite forming apparatus of claim 1, wherein the forming feature comprises a bladder.

5. The composite forming apparatus of claim 1, wherein the positioning member comprises a positioning actuator.

6. The composite forming apparatus of claim 5, wherein the positioning actuator comprises a pneumatic actuator.

7. The composite forming apparatus of claim 5, wherein the positioning actuator comprises a hydraulic actuator.

8. The composite forming apparatus of claim 5, wherein the positioning actuator is operatively associated with a servo motor.

9. The composite forming apparatus of claim 1, wherein the positioning member is selectively movable between at least a first position and a second position.

10. The composite forming apparatus of claim 9, wherein:
    the forming feature assumes a first cross-sectional shape when the positioning member is in the first position, and
    the forming feature assumes a second cross-sectional shape different from the first cross-sectional shape when the positioning member is in the second position.

11. The composite forming apparatus of claim 1, wherein:
    the forming feature comprises one of a plurality of forming features extending along a longitudinal axis, and
    the positioning member is one of a plurality of positioning members located along the longitudinal axis, each positioning member of the plurality of positioning members being engageable with an associated forming feature of the plurality of forming features.

12. The composite forming apparatus of claim 11, wherein each positioning member of the plurality of positioning members is independently movable between at least a first position and a second position.

13. A method for manipulating a composite material on a forming tool using the composite forming apparatus of claim 1, the method comprising:
    providing the composite forming apparatus of claim 1; moving the stomping foot into engagement with the composite ply; pressing the composite ply against the forming surface of the forming tool; positioning the positioning member into engagement with the forming feature; moving the forming feature to the sweeping position to engage with the composite ply; sweeping the composite ply with the forming feature relative to the forming tool away from the stomp foot and toward the ply support member beyond the forming tool to form the composite ply over the forming tool; and manipulating the forming feature during the sweeping using the positioning member.

14. A composite forming apparatus for manipulating a composite material, the composite forming apparatus comprising:
    a stomp foot selectively moveable between a stomp position and another position, the stomp foot pressing a composite ply against a forming surface of a forming tool in the stomp position;
    a forming feature selectively moveable to a sweeping position, the forming feature engaging with the composite ply in the sweeping position after the composite ply is pressed against the forming surface and sweeping the composite ply relative to the forming tool away from the stomp foot and toward a ply support member beyond the forming tool to form the composite ply over the forming tool; and
    a positioning member selectively moveable in relation to the forming feature and manipulating at least one of a position, a profile, and an orientation of the forming feature in relation to the composite ply during the sweeping in response to selective movement of the positioning member.

15. The composite forming apparatus of claim 14, wherein the positioning member comprises at least one of a shim, a bladder, a positioning actuator, a pneumatic actuator, a hydraulic actuator and a servo motor.

16. The composite forming apparatus of claim 14, wherein the positioning member is selectively movable between at least a first position and a second position.

17. The composite forming apparatus of claim 14, wherein the positioning member is automatically movable between at least a first position and a second position.

18. The composite forming apparatus of claim 14, further comprising:
- a control unit in operative communication with the positioning member to automatically control movement of the positioning member between at least a first position and a second position.

19. The composite forming apparatus of claim 18 wherein the positioning member comprises a bladder.

20. The composite forming apparatus of claim 19 wherein inflation and deflation of the bladder is automatically controlled.

* * * * *